United States Patent
Mikawa (10) Patent No.: US 10,922,784 B2
(45) Date of Patent: Feb. 16, 2021

(54) IMAGE PROCESSING APPARATUS AND IMAGE PROCESSING METHOD THAT SET A SWITCH SPEED TO SWITCH A SERIES OF IMAGES FROM ONE TO ANOTHER IN A SEQUENTIAL DISPLAY WITH THE FASTER THE SPEED, THE LARGER A REGION OUTPUT FROM THE IMAGES

(71) Applicant: CANON KABUSHIKI KAISHA, Tokyo (JP)

(72) Inventor: Takuma Mikawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 240 days.

(21) Appl. No.: 15/221,634

(22) Filed: Jul. 28, 2016

(65) Prior Publication Data
US 2017/0052690 A1 Feb. 23, 2017

(30) Foreign Application Priority Data

Aug. 21, 2015 (JP) .............................. JP2015-163891

(51) Int. Cl.
| | | |
|---|---|---|
| *G06T 3/40* | (2006.01) | |
| *G11B 27/00* | (2006.01) | |
| *H04N 5/262* | (2006.01) | |
| *G11B 27/34* | (2006.01) | |

(52) U.S. Cl.
CPC .............. *G06T 3/40* (2013.01); *G11B 27/005* (2013.01); *G11B 27/34* (2013.01); *H04N 5/262* (2013.01); *G06T 2207/10004* (2013.01); *G06T 2207/10016* (2013.01); *G06T 2210/22* (2013.01)

(58) Field of Classification Search
CPC ..... G06F 3/04847; G06F 3/0481; G06T 3/40; G06T 11/60; G06T 2207/10016; G06T 2207/10004; G06T 2210/22; G11B 27/005; H04N 21/4728
See application file for complete search history.

(56) References Cited

U.S. PATENT DOCUMENTS

| | | | |
|---|---|---|---|
| 6,445,412 B1 * | 9/2002 | Shiohara ............... | H04N 1/0044 348/333.05 |
| 8,266,550 B1 * | 9/2012 | Cleron .................. | G06F 1/1633 345/173 |
| 2003/0090504 A1 * | 5/2003 | Brook ............... | G06F 17/30843 715/716 |

(Continued)

FOREIGN PATENT DOCUMENTS

JP H11-331673 A 11/1999

*Primary Examiner* — Nicholas Klicos
(74) *Attorney, Agent, or Firm* — Venable LLP (57) ABSTRACT

An image processing apparatus includes a control unit to control operation, when displaying an image out of a series of images on a display device, so as to cut out a partial region of the images as a cutout region, and to display an image of the cutout region, and a speed setting unit to set a switch speed to switch the series of images from one image to a next, when displaying the series of images, in order. The control unit displays, in accordance with a change of the switch speed, the image of the cutout region, that is different from a region of the series of images displayed before the change of the switch speed, by changing a size of the cutout region. The control unit changes the size of the cutout region to be larger in accordance with the switch speed being changed to a faster speed.

21 Claims, 8 Drawing Sheets

(56) References Cited

U.S. PATENT DOCUMENTS

| | | | | |
|---|---|---|---|---|
| 2004/0189691 A1* | 9/2004 | Jojic | .............. | G06F 17/30825 715/720 |
| 2007/0025688 A1* | 2/2007 | Pejhan | .............. | H04N 5/783 386/344 |
| 2009/0313584 A1* | 12/2009 | Kerr | .............. | G06F 3/012 715/849 |
| 2010/0277596 A1* | 11/2010 | Nakamura | .............. | G01S 3/7865 348/169 |
| 2010/0315521 A1* | 12/2010 | Kunishige | .............. | H04N 5/232 348/220.1 |
| 2011/0074716 A1* | 3/2011 | Ono | .............. | G06F 1/1626 345/173 |
| 2011/0211802 A1* | 9/2011 | Kamada | .............. | G11B 27/34 386/201 |
| 2012/0030634 A1* | 2/2012 | Miyazaki | .............. | G06F 3/04847 715/863 |
| 2012/0033933 A1* | 2/2012 | Suzuki | .............. | G11B 27/105 386/230 |
| 2012/0166950 A1* | 6/2012 | Frumar | .............. | G06F 3/04883 715/719 |
| 2012/0210230 A1* | 8/2012 | Matsuda | .............. | G11B 27/034 715/723 |
| 2012/0216121 A1* | 8/2012 | Lin | .............. | H04N 21/234327 715/721 |
| 2012/0293679 A1* | 11/2012 | Aiba | .............. | H04N 9/8205 348/222.1 |
| 2013/0132462 A1* | 5/2013 | Moorer | .............. | H04N 21/2343 709/203 |
| 2013/0169834 A1* | 7/2013 | Herz | .............. | G06T 5/50 348/220.1 |
| 2015/0248198 A1* | 9/2015 | Somlai-Fisher | .............. | G06F 3/0481 715/716 |
| 2015/0253968 A1* | 9/2015 | Joo | .............. | G06F 3/04842 715/798 |
| 2016/0165173 A1* | 6/2016 | Lesh | .............. | H04N 5/783 386/241 |
| 2016/0253087 A1* | 9/2016 | Moon | .............. | G06F 3/041 715/720 |

* cited by examiner

IMAGE PROCESSING APPARATUS AND IMAGE PROCESSING METHOD THAT SET A SWITCH SPEED TO SWITCH A SERIES OF IMAGES FROM ONE TO ANOTHER IN A SEQUENTIAL DISPLAY WITH THE FASTER THE SPEED, THE LARGER A REGION OUTPUT FROM THE IMAGES

CLAIM TO PRIORITY

This application claims the benefit of Japanese Patent Application No. 2015-163891, filed on Aug. 21, 2015, which is hereby incorporated by reference herein in its entirety.

BACKGROUND OF THE INVENTION

Field of the Invention

The present invention relates to an image processing apparatus and an image processing method.

Description of the Related Art

There have been playback methods of magnifying and displaying a portion of a moving image while playing the moving image. In recent years, in particular, the resolutions of moving image data have increased to high resolutions, such as HD, 4K, and 8K, and there have been more and more opportunities to magnify and to display a portion of a moving image. Also, omnidirectional moving images obtained by capturing images with a plurality of cameras, or the like, have been known, and when such an omnidirectional moving image is displayed, a portion of the entire moving image is often cut out and displayed.

As a playback method of magnifying and displaying a portion of a moving image while playing the moving image, Japanese Patent Application Laid-Open No. H11-331673 proposes a method that enables designation of the magnification ratio and the display position while the moving image is played.

However, changing the playback speed during magnified display of the moving image sometimes makes it difficult to figure out the content of the moving image, depending on the situation. For example, in a case when the playback speed is changed to "fast-forward" for a scene search, it would be difficult to identify moving objects and difficult to search for scenes if the angle of view is kept narrow.

SUMMARY OF THE INVENTION

An object of the present invention is to provide an image processing apparatus and an image processing method that, during sequential display of a plurality of pieces of image data, such as playback of a moving image, can prevent a situation in which changing the playback speed, while the image data is magnified and displayed, makes it difficult to figure out the content.

According to one aspect, the present invention provides an image processing apparatus sequentially displaying a series of images on a display device, including a region setting unit configured to set a display region to be cut out from the images and displayed, a speed setting unit configured to set a switch speed at which to switch the series of images from one another, and a change unit configured, when the speed setting unit changes the switch speed during sequentially displaying the series of images on the display device, to change a region to be cut out as the display region, in accordance with the changed switch speed, wherein the change unit changes the display region such that the faster the changed switch speed, the larger the region to be cut out from the images.

According to another aspect, the present invention provides an image processing method of sequentially displaying a series of images on a display device, including setting a display region to be cut out from the images and displayed, setting a switch speed at which to switch the images from one another, and when the switch speed is changed during sequentially displaying the series of images on the display device, changing a region to be cut out as the display region, in accordance with the changed switch speed, wherein, in the changing of the display region, the display region is changed such that the faster the changed switch speed, the larger the region to be cut out from the images.

According to a further aspect, the present invention provides a non-transitory computer-readable storage medium recording a program that, when sequentially displaying a series of images on a display device, causes a computer to execute setting a display region to be cut out from the images and displayed, setting a switch speed at which to switch the series of images from one another, and, when the switch speed is changed during sequentially displaying the series of images on the display device, changing a region to be cut out as the display region, in accordance with the changed switch speed, the display region being changed such that the faster the changed switch speed, the larger the region to be cut out from the images.

Further features of the present invention will become apparent from the following description of exemplary embodiments with reference to the attached drawings.

DESCRIPTION OF THE EMBODIMENTS

First Embodiment

An image processing apparatus and an image processing method according to a first embodiment of the present invention will be described with reference to FIG. 1 to FIG. 6C.

Figure 1:
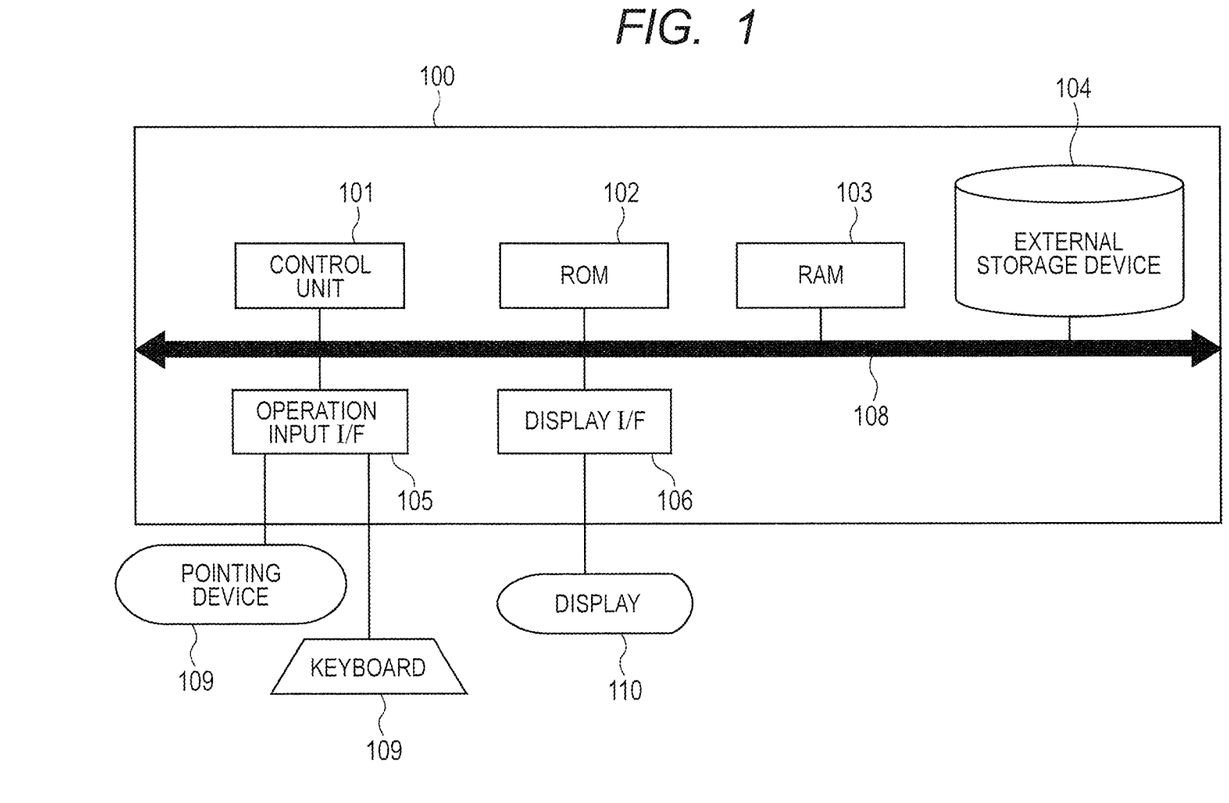
FIG. 1 is a block diagram illustrating the configuration of an image processing apparatus according to a first embodiment of the present invention.
Figure 2:
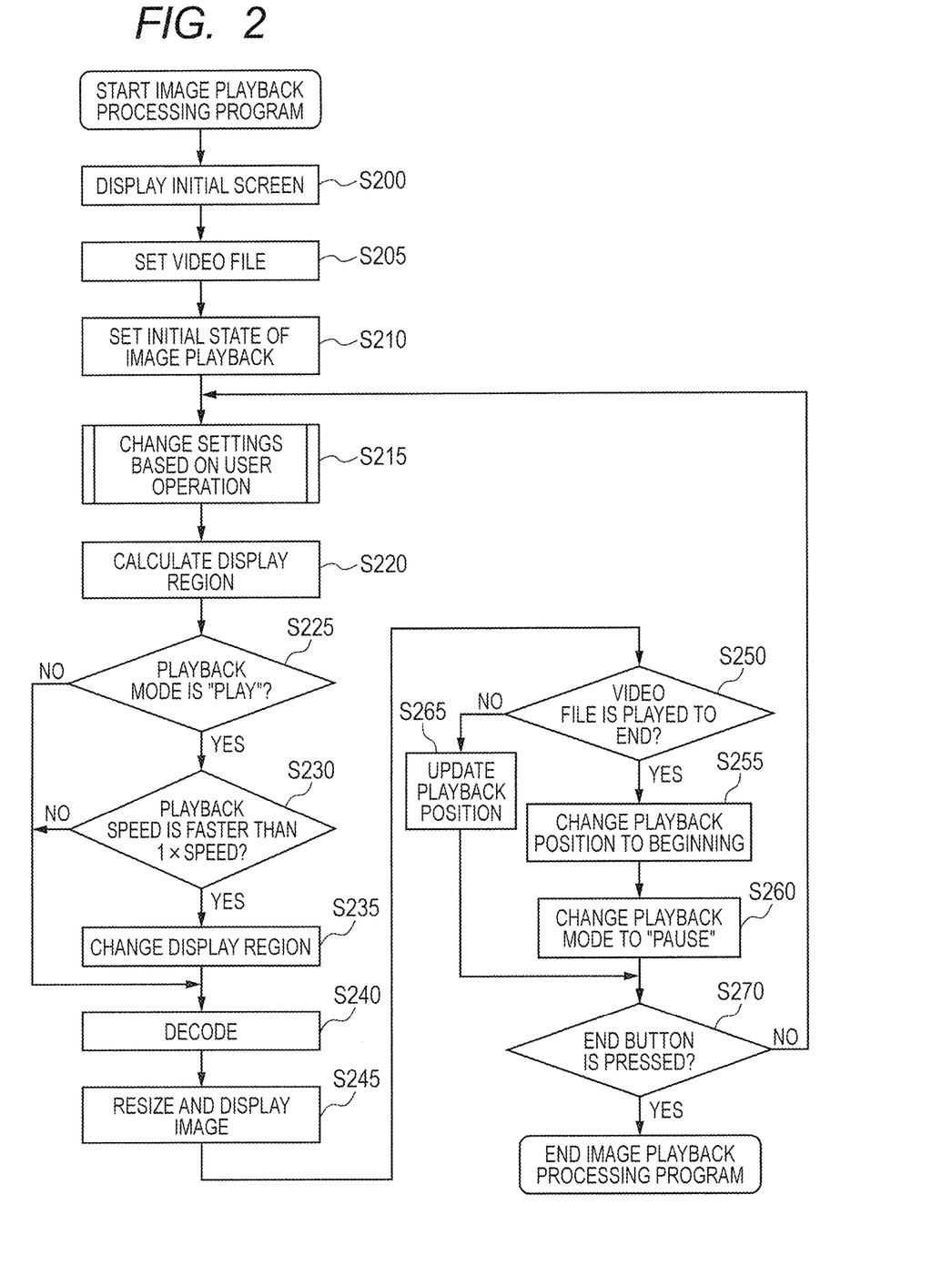
FIG. 2 is a flowchart illustrating an image processing method according to the first embodiment of the present invention.
Figure 3:
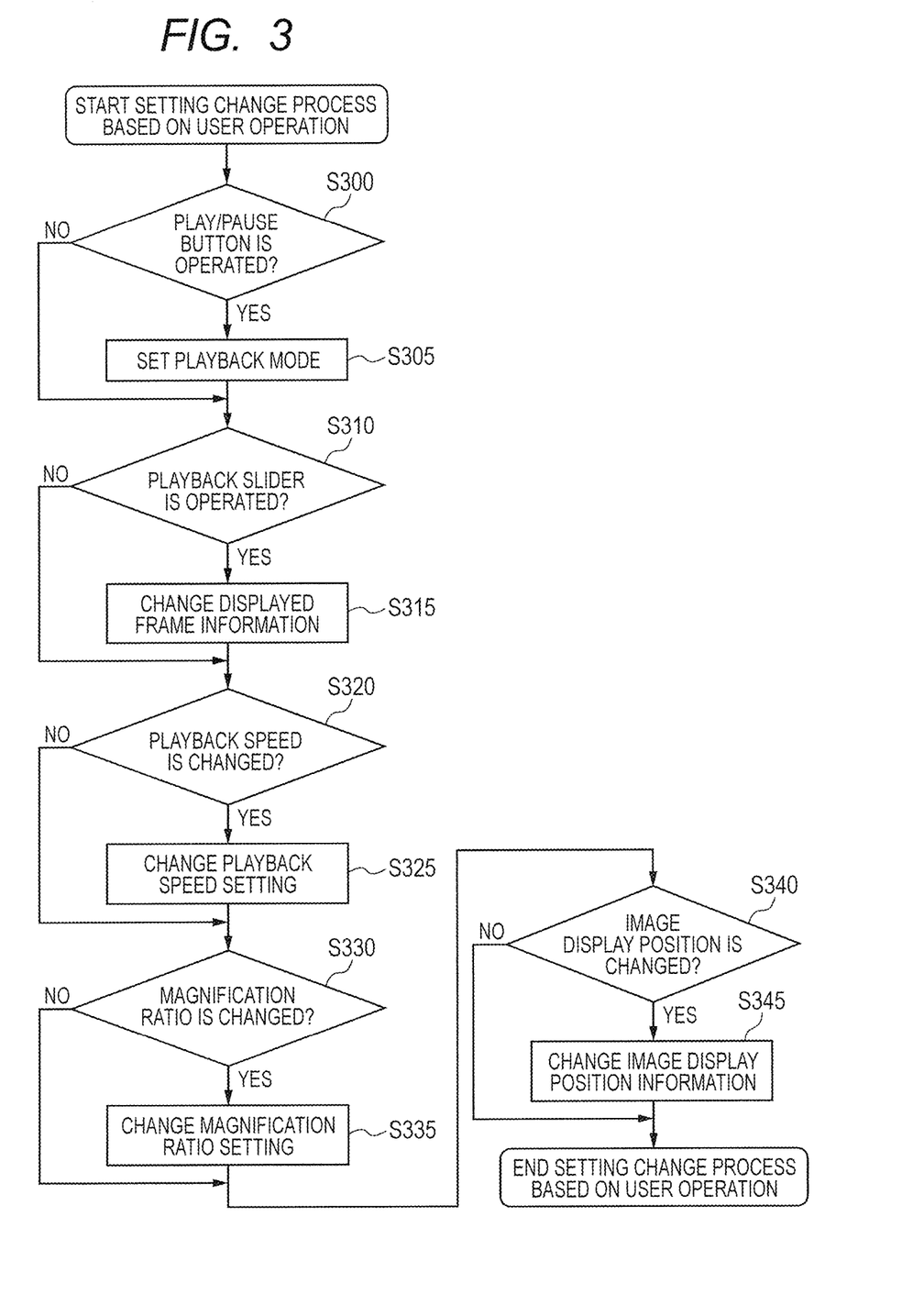
FIG. 3 is a flowchart illustrating the procedure of a setting change process based on a user operation in the image processing method according to the first embodiment of the present invention.
Figure 4:
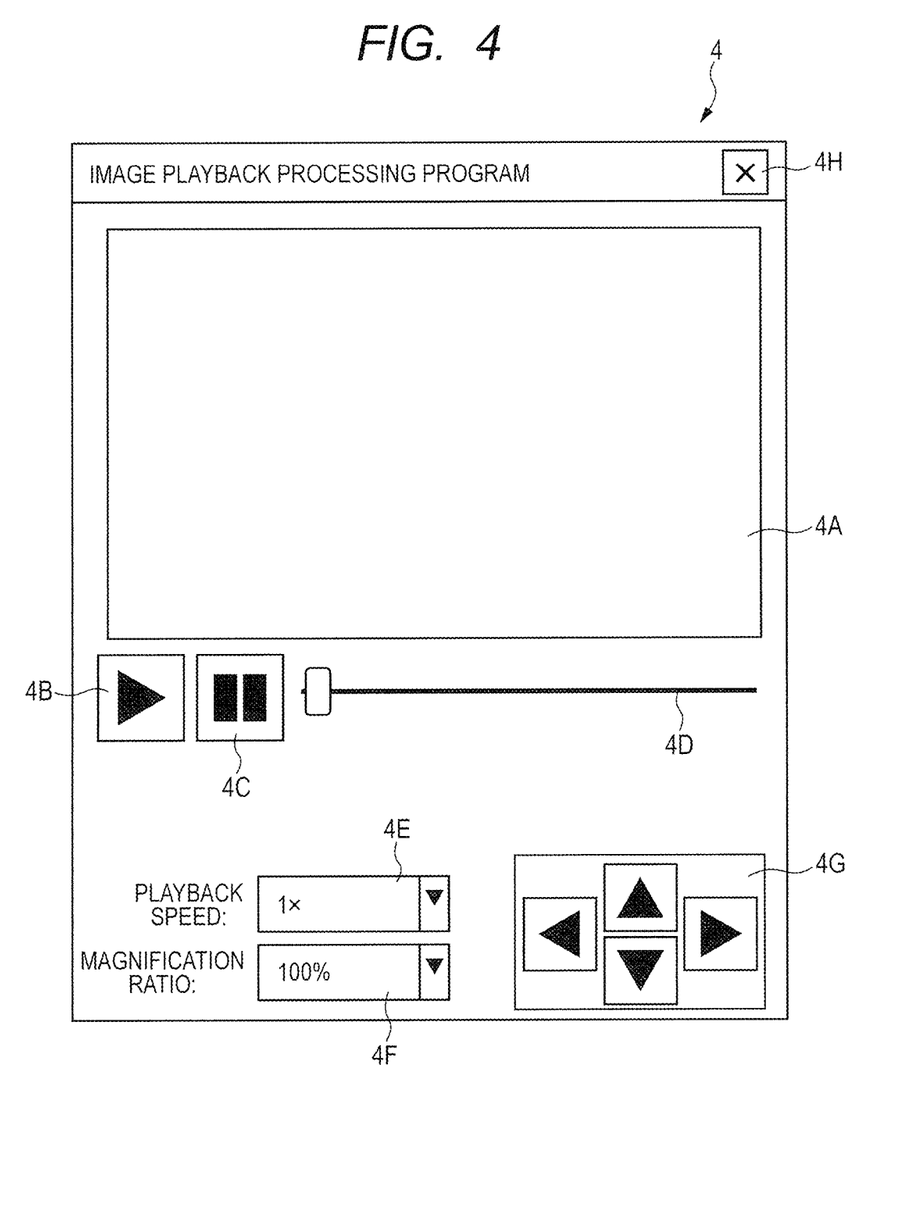
FIG. 4 is a diagram illustrating an example of a display of an image playback processing program in the image processing method according to the first embodiment of the present invention.
Figure 5A:
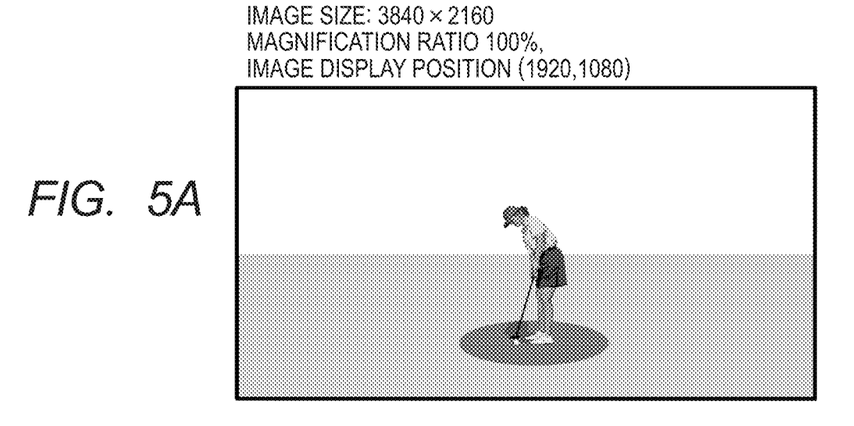
FIGS. 5A, 5B, and 5C are explanatory diagrams of a display region calculation process in the image processing method according to the first embodiment of the present invention.
Figure 5B:
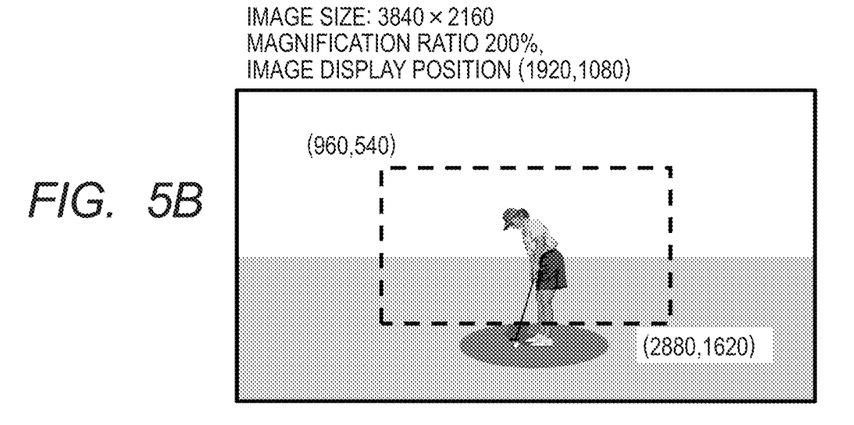
Figure 5C:
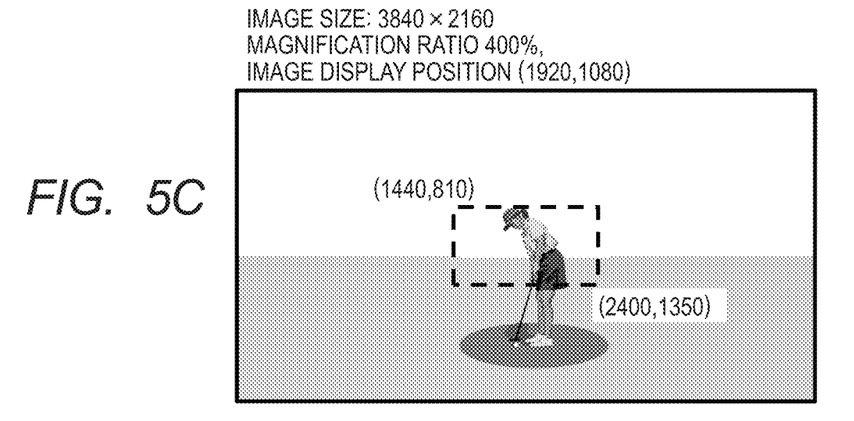
Figure 6A:
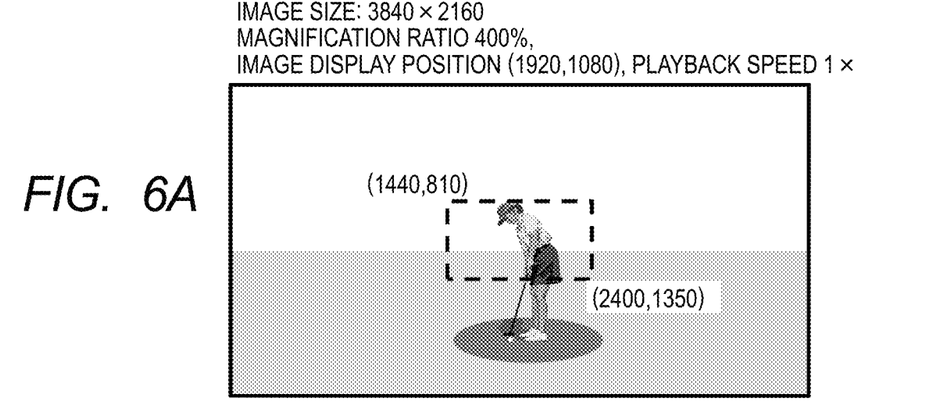
FIGS. 6A, 6B, and 6C are explanatory diagrams of a display region change process in the image processing method according to the first embodiment of the present invention.
Figure 6B:
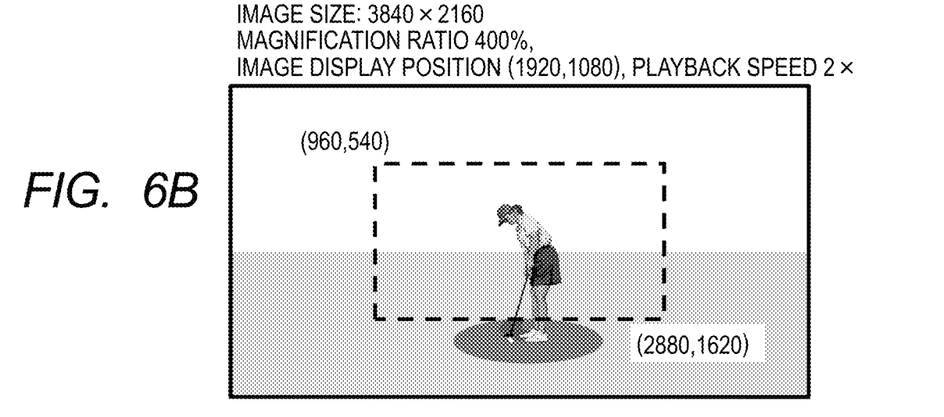
Figure 6C:
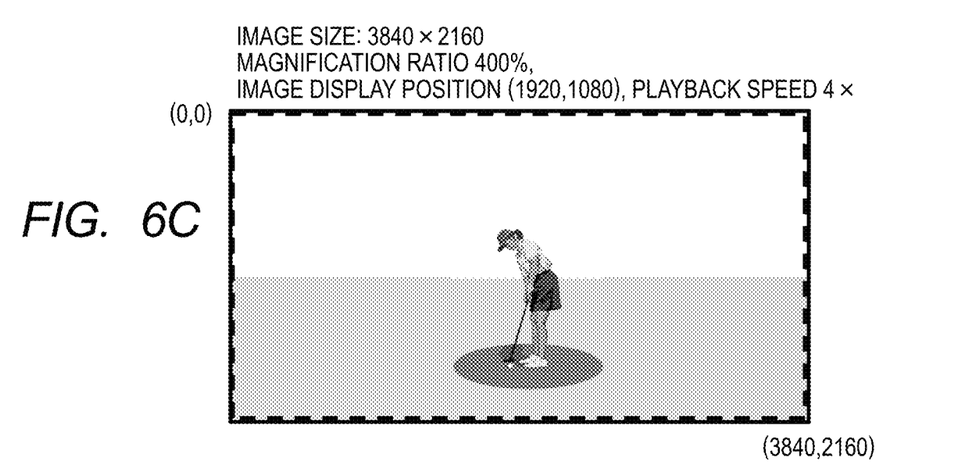

FIG. 1 is a block diagram illustrating the configuration of the image processing apparatus according to the present embodiment. FIG. 2 is a flowchart illustrating the image processing method according to the present embodiment. FIG. 3 is a flowchart illustrating the procedure of a setting change process based on a user operation in the image processing method according to the present embodiment. FIG. 4 is a diagram illustrating an example of a display of an image playback processing program in the image processing method according to the present embodiment. FIGS. 5A to 5C are explanatory diagrams of a display region calculation process in the image processing method according to the present embodiment. FIGS. 6A to 6C are explanatory diagrams of a display region change process in the image processing method according to the present embodiment.

First, the configuration of the image processing apparatus according to the present embodiment will be described with reference to FIG. 1.

As illustrated in FIG. 1, an image processing apparatus 100 according to the present embodiment can be constructed as a computer apparatus including a control unit 101, a ROM 102, a RAM 103, an external storage device 104, an operation input interface (I/F) 105, a display interface (I/F) 106, and a system bus 108.

The control unit 101 is configured to control the entire image processing apparatus 100, and is a central processing unit (CPU), for example. The ROM 102 is a read only memory configured to store programs and parameters that do not need to be changed. The RAM 103 is a writable and readable memory (Random Access Memory) configured to temporarily store programs and data supplied from external devices, and the like.

The external storage device 104 is configured to record a program to be executed by the image processing apparatus 100, digital data such as moving image data, and the like. The external storage device 104 records a later-described image playback processing program as a program code that can be read out by the control unit 101, and the control unit 101 is configured to execute this program code. Note that the image playback processing program may be recorded in a storage device other than the external storage device 104, e.g., the ROM 102 or a storage device on a network (not illustrated). Examples of the external storage device 104 include a hard disk drive and a memory card fixedly installed in the image processing apparatus 100. Examples also include a floppy (registered trademark) disk (FD), an optical disk, such as a compact disk (CD), a magnetic card, an optical card, an integrated circuit (IC) card, and the like, which are detachable from the image processing apparatus 100.

The operation input I/F 105 is an interface (I/F) with input devices 109 configured to input data corresponding to user operation, e.g., a pointing device (mouse) and a keyboard. The display I/F 106 is an interface with a display 110 configured to display data held in the image processing apparatus 100 and data supplied.

The system bus 108 is configured to communicatively connect the control unit 101, the ROM 102, the RAM 103, the external storage device 104, the operation input I/F 105, and the display I/F 106 to each other.

Next, the image processing method according to the present embodiment will be described with reference to FIG. 1 to FIG. 6C.

In the present embodiment, a description will be given of an example of an image processing method to be executed by application software that runs on a PC and is configured to play moving image data. This application software is capable of setting the image playback speed, the image magnification ratio, and the image display position. The playback speed can be set at five different levels of ½× speed, 1× speed, 2× speed, 4× speed, and 8× speed. A moving image is played at the normal speed when the playback speed is 1× speed. Also, the magnification ratio can be set at four different levels of 100%, 200%, 400%, and 800%. A moving image is played with its entire image displayed when the magnification ratio is 100%.

Note that, in the present embodiment, a description will be exemplarily given of a case in which an H.264 encoded MP4 video file is handled. However, video files of other formats can be handled as well. Also, in the present embodiment, a description will be given of a case in which a portion of a normal moving image is cut out, magnified, and displayed. However, the present invention is also applicable to cases in which, for example, a region to be cut out from an omnidirectional image is optionally designated out of all three hundred sixty-degree directions and displayed.

The image processing method according to the present embodiment is implemented by the control unit 101 executing the image playback processing program involving performing processes along the flowcharts illustrated in FIG. 2 and FIG. 3.

Upon a start of the image playback processing program, the control unit 101 displays an initial screen 4 as illustrated in FIG. 4, for example, on the display 110 (Step S200). The initial screen 4 illustrated in FIG. 4 includes an image display area 4A, a play button 4B, a pause button 4C, a playback slider 4D, a playback speed setting control 4E, a magnification ratio setting control 4F, a magnified display position setting control 4G, and an end button 4H.

The playback slider 4D is a slider commonly used in image playback applications, and has functions of visually presenting the frame position of the moving image displayed and allowing a shift of the frame position through operation on an indicator. The playback speed setting control 4E is a drop-down list, for example, through which the playback speed can be selected from ½×, 1×, 2×, 4×, and 8× speeds in the present embodiment. The playback slider 4D and the playback speed setting control 4E are an example of a display speed information setting unit configured to set display speed information in accordance with instructions from the user.

The magnification ratio setting control 4F is a drop-down list, for example, through which the image magnification ratio can be selected from 100%, 200%, 400%, and 800% in the present embodiment. The magnified display position setting control 4G includes four, up, down, right, and left buttons. The magnification ratio setting control 4F and the magnified display position setting control 4G are an example of a display region information setting unit configured to set display region information in accordance with instructions from the user.

The user can operate this image playback processing program through the input devices 109 and the graphical user interface (GUI) displayed on the display 110. Commonly used devices, including a keyboard, a pointing device, such as a mouse, a touchscreen integrated with the display 110, and the like, can be used as the input devices 109.

In Step S205, the control unit 101 then sets a video file in accordance with an instruction from the user. For example, the control unit 101 displays a file selection dialog (not illustrated) on the display 110. In this way, the user can select a desired video file from the video files stored in the external storage device 104. For the selection of a video file, a file open dialog that is originally prepared in the operating system (OS) can be used, for example.

In Step S210, the control unit 101 then determines the initial settings of image playback information. The image playback information contains six pieces of information, namely, file path information, displayed frame information, playback mode information, playback speed information, magnification ratio information, and image display position information, for example. These pieces of image playback information are held in the RAM 103.

Here, the file path information is information indicating the full path of the video file selected by the user in Step S205.

The displayed frame information is information indicating the frame number from the beginning of the moving image. In Step S210, the displayed frame information is initialized to zero, which means the beginning.

The playback mode information is information indicating the image playback state, and includes two playback modes "PLAY" and "PAUSE." In Step S210, the playback mode information is initialized to "PLAY," which means being played. The play state can be controlled by means of the play button 4B, the pause button 4C, and the like.

The playback speed information is information indicating the image playback speed, and can be set at five different levels in the present embodiment. In Step S210, the playback speed information is initialized to 1× speed. The playback speed information can be controlled by means of the playback speed setting control 4E.

The magnification ratio information is information indicating the image magnification ratio during the image playback, and can be set at four different levels in the present embodiment. In Step S210, the magnification ratio information is initialized to 100%. The magnification ratio information can be controlled by means of the magnification ratio setting control 4F.

The image display position information is information indicating which point on the moving image is the center, while a magnified display is set. In Step S210, the image display position information is initialized to information indicating the center coordinates. For example, in a case of handling moving image data having a size of 3840×2160, the image display position information is initialized to the values of the center coordinates (1920, 1080). The image display position information can be controlled by means of the magnified display position setting control 4G.

In Step S215, the control unit 101 then performs the setting change process based on a user operation. Specifically, the control unit 101 performs a process of changing the pieces of information mentioned above from their initial states set in Step S210, in accordance with the user operation. Here, the displayed frame position can be controlled by means of the playback slider 4D. The playback mode setting can be controlled by means of the play button 4B and the pause button 4C. The playback speed information can be controlled by means of the playback speed setting control 4E. The magnification ratio information can be controlled by means of the magnification ratio setting control 4F. The image display position information can be controlled by means of the magnified display position setting control 4G.

Details of the setting change process, based on a user operation, executed in Step S215, will be described with reference to the flowchart in FIG. 3.

In Step S300, the control unit 101 determines whether or not the play button 4B or the pause button 4C is pressed. The control unit 101 advances the process to Step S305 if determining that the play button 4B or the pause button 4C is pressed, whereas the control unit 101 advances the process to Step S310 if determining that neither the play button 4B nor the pause button 4C is pressed.

In Step S305, the control unit 101 sets the playback mode in accordance with the user operation in Step S300. Specifically, the control unit 101 sets the playback mode to "PLAY" if the play button 4B is pressed in Step S300, whereas the control unit 101 sets the playback mode to "PAUSE" if the pause button 4C is pressed in Step S300.

In Step S310, the control unit 101 then determines whether or not the playback slider 4D is operated. The control unit 101 advances the process to Step S315 if determining that the playback slider 4D is operated, whereas the control unit 101 advances the process to Step S320 if determining that the playback slider 4D is not operated.

In Step S315, the control unit 101 sets the displayed frame information in accordance with the user operation, in Step S310. Specifically, the control unit 101 updates the value of the displayed frame information in accordance with the position of the indicator of the playback slider 4D operated in Step S310. Note that the frame is at the beginning of the moving image when the indicator of the playback slider 4D is at the far-left position, and the frame is at the end of the moving image when the indicator of the playback slider 4D is at the far-right position.

In Step S320, the control unit 101 then determines whether or not the playback speed setting control 4E is operated. The control unit 101 advances the process to Step S325 if determining that the playback speed setting control 4E is operated, whereas the control unit 101 advances the process to Step S330 if determining that the playback speed setting control 4E is not operated.

In Step S325, the control unit 101 sets the playback speed information in accordance with the user operation in Step S320. Specifically, the control unit 101 sets the playback speed information in accordance with the item on the drop-down list of the playback speed setting control 4E selected in Step S320. In this step, the control unit 101 functions as a display speed setting unit.

In Step S330, the control unit 101 then determines whether or not the magnification ratio setting control 4F is operated. The control unit 101 advances the process to Step S335 if determining that the magnification ratio setting control 4F is operated, whereas the control unit 101 advances the process to Step S340 if determining that the magnification ratio setting control 4F is not operated.

In Step S335, the control unit 101 sets the magnification ratio information in accordance with the user operation, in Step S330. Specifically, the control unit 101 sets the magnification ratio information in accordance with the item on the drop-down list of the magnification ratio setting control 4F selected in Step S330.

In Step S340, the control unit 101 then determines whether or not the magnified display position setting control 4G is operated. The control unit 101 advances the process to Step S345 if determining that the magnified display position setting control 4G is operated, whereas the control unit 101 ends the setting change process based on user operation if determining that the magnified display position setting control 4G is not operated.

In Step S345, the control unit 101 sets the image display position information in accordance with the user operation in Step S340. Specifically, the control unit 101 sets the image display position information by moving it vertically and horizontally in accordance with the operation on the up, down, right, and left buttons of the magnified display position setting control 4G in Step S340. For example, in a case when the up button is operated, the control unit 101 decrements the Y-coordinate value of the image display position information by one. The operation is, of course, processed in such a way as not to update the setting if the image display position has reached the edge of the image and cannot be moved any further. The image display position may be set through a keyboard operation, a drag operation of the mouse, or the like. After Step S345, the setting change process based on a user operation ends.

Note that the order in which the pieces of information are subjected to the setting change process is not particularly limited.

The control unit 101 advances to Step S220 after the setting change process based on a user operation in Step S215 thus ends.

In Step S220, the control unit 101 performs the display region calculation process. Specifically, the control unit 101 calculates the display region that has been actually set by the user, based on the magnification ratio information and the image display position information stored in the RAM 103. In this step, the control unit 101 functions as a display region setting unit. A case of handling moving image data having a size of 3840×2160 will be exemplarily described with reference to FIG. 5A, FIG. 5B, and FIG. 5C.

FIG. 5A illustrates the entire image of moving image data. When the magnification ratio information is 100%, the display region is the entire range of the moving image, as illustrated in FIG. 5A. When the magnification ratio information is set at 200% and the image display position information is set at the center coordinates (1920, 1080), the display region is a region situated in the center of the image and measuring ½ in length in each of the vertical direction and the horizontal direction. Specifically, as illustrated by the dotted line in FIG. 5B, the display region is a rectangular region having coordinates of (960, 540) at the top left corner and coordinates of (2880, 1620) at the bottom right corner. When the magnification ratio information is set at 400% and the image display position information is set at (1920, 1080), the display region is a rectangular region having coordinates of (1440, 810) at the top left corner and coordinates of (2400, 1350) at the bottom right corner, as illustrated in FIG. 5C.

In Step S225, the control unit 101 then determines whether or not the playback mode is set to "PLAY." The control unit 101 refers to the playback mode information stored in the RAM 103, and the control unit 101 advances the processing to Step S230 if the playback mode is set to "PLAY," whereas the control unit 101 advances to the processing to Step S240 if the playback mode is set to "PAUSE."

In Step S230, the control unit 101 determines whether or not the playback speed is set at a value greater than 1× speed. The control unit 101 advances the processing to Step S235 if the playback speed is set at a value greater than 1× speed, whereas the control unit 101 advances the processing to Step S240 if the playback speed is set at or below 1× speed.

In the next step, Step S235, the control unit 101 performs a process of changing the current display region with the display region calculated in Step S220. Specifically, in this step, the control unit 101 functions as a display region change unit. The process in Step S235 is performed when the playback mode is "PLAY" and, also, the playback speed is at a value greater than 1× speed. For example, when the playback speed is set at N× speed, the process is performed such that the display region is expanded to be N times larger in each of the vertical direction and the horizontal direction (the area becomes N×N times larger). For example, when the playback speed is set at 2× speed, the display region is set to be two times larger in the vertical direction and two times larger in the horizontal direction. Note, that if the display region after being expanded to be N times larger is larger than the moving image in the entirely displayed state, the entire range of the moving image is displayed.

An example of the process in Step S235 will be described with reference to FIG. 6A, FIG. 6B, and FIG. 6C. When the magnification ratio information is set at 400%, the image display position information is set at (1920, 1080), and the playback speed is set at 1× speed, the display region has not been changed from the settings in Step S220, and the display region is as illustrated by the dotted line in FIG. 6A. On the other hand, when the magnification ratio information is set at 400%, the image display position information is set at (1920, 1080), and the playback speed is set at 2× speed, the display region is set to be two times larger in the vertical direction and two times larger in the horizontal direction. Specifically, as illustrated by the dotted line in FIG. 6B, the display region is changed to a rectangular region having coordinates of (960, 540) at the top left corner and coordinates of (2880, 1620) at the bottom right corner. Further, when the playback speed is set at 4× speed, the display region is four times larger in the vertical direction and four times larger in the horizontal direction, and the display region is changed to the entire range (having coordinates of (0, 0) at the top left corner and coordinates of (3840, 2160) at the bottom right corner), as illustrated by the dotted line in FIG. 6C.

As described above, by the process from Step S225 to Step S235, the display region during magnified display can be changed in accordance with the playback speed.

Note that, in the present embodiment, an example has been described in which the display region is expanded to be N times larger in each of the vertical direction and the horizontal direction when the playback speed is set at N× speed, but the display region may be expanded by using a different ratio. For example, a change process may be performed in which the display region is made N times larger in area when the playback speed is set at N× speed. Also, in still another method of expanding the image display region, the display region may be expanded by displaying a plurality of image display areas. Also, in the present embodiment, a case has been described in which the playback speed is set at five different levels, but the present invention is also applicable to cases when the playback speed is set at a greater number of levels. In such a case, the operation is such that the display region is changed at the greater number of levels corresponding to the number of levels for the playback speed.

In Step S240, the control unit 101 then performs a process of decoding frame data corresponding to the displayed frame information on the moving image. In the present embodiment, the control unit 101 performs a decoding process on H.264 data.

In Step S245, the control unit 101 then cuts out the display region determined in Step S220 or Step S235 from the image data decoded in Step S240, resizes the cut display region such that it fits the image display area 4A, and displays the resized display region. Note that the duration of display of the image data in Step S245 is dependent on the frame rate and playback speed of the moving image. For example, in a case of displaying a thirty-fps moving image at 1× speed, the duration of display of one frame is 1/30 second. In a case of displaying a thirty-fps moving image at 2× speed, the duration of display of one frame is 1/60 second.

In Step S250, the control unit 101 then determines whether or not the moving image has been played to the end. The control unit 101 advances the processing to Step S255 if determining that the moving image has been played to the end, whereas the control unit 101 advances the processing to Step S265 if determining that the moving image has not yet been played to the end.

In Step S255, the control unit 101 sets the displayed frame information on the moving image at zero to bring the displayed frame information back to the beginning. In the next step, Step S260, the control unit 101 sets the playback mode of the moving image to "PAUSE." Thus, in the case when the moving image has been played to the end, the control unit 101 operates through the setting actions in Step S255 and Step S260, such that the moving image pauses at the beginning thereof.

On the other hand, in Step S265, the control unit 101 changes (increments) the displayed frame information to the next frame number if the playback mode is set to "PLAY," whereas the control unit 101 leaves the displayed frame information as is if the playback mode is set to "PAUSE."

In Step S270, the control unit 101 determines whether or not the end button 4H is pressed. If determining that the end button is pressed, the control unit 101 ends the program. On the other hand, if determining the end button is not pressed, the control unit 101 brings the image playback processing back to Step S215 to continue the processing.

By repeating Step S215 to Step S270, as described above, pieces of image data can be displayed while being sequentially switched from one another, in other words, a moving image is played. Also, the operation can be such that when the playback speed is changed, the display region is changed in accordance with the changed playback speed.

As described above, the image processing method according to the present embodiment is configured such that, when a playback speed is selected and set from among a plurality of settable playback speeds, the display region is expanded in accordance with the display speed thus set. Thus, the faster the playback speed, the larger the viewable display region within the image and, hence, the more easily the content of the moving image can be figured out. For example, a fast playback speed is often set presumably for a search purpose, in which case, the content can be more easily figured out with the operation of expanding the display region in accordance with the playback speed. Also, in a case when the viewer is focusing on a moving object in a moving image, the likelihood of the viewer failing to visually follow the moving object increases the faster the playback speed. However, the viewer can more easily figure out the content even when the content is a moving object, with the operation of expanding the display region in accordance with the playback speed.

Second Embodiment

Figure 7:
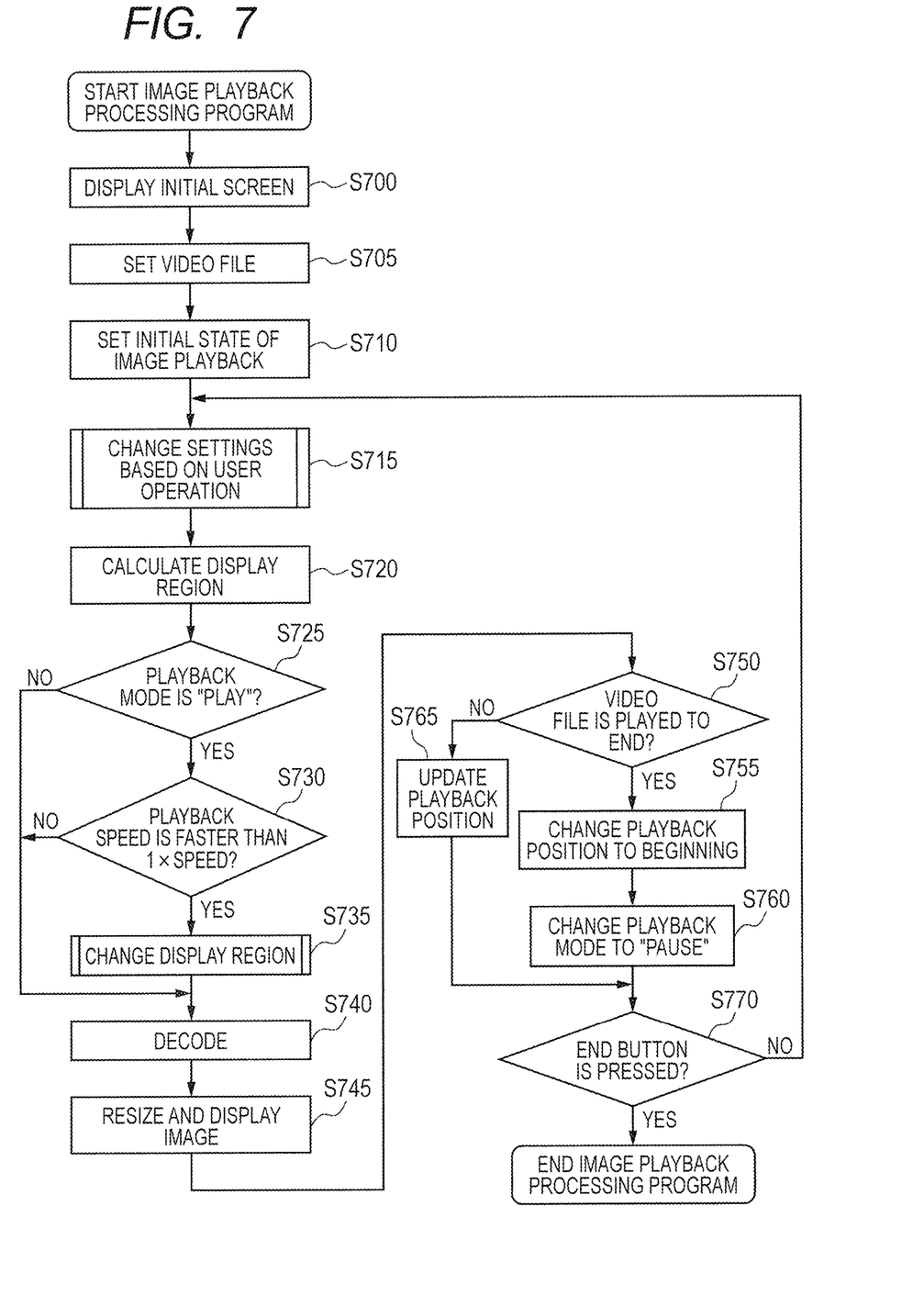
FIG. 7 is a flowchart illustrating an image processing method according to a second embodiment of the present invention.
Figure 8:
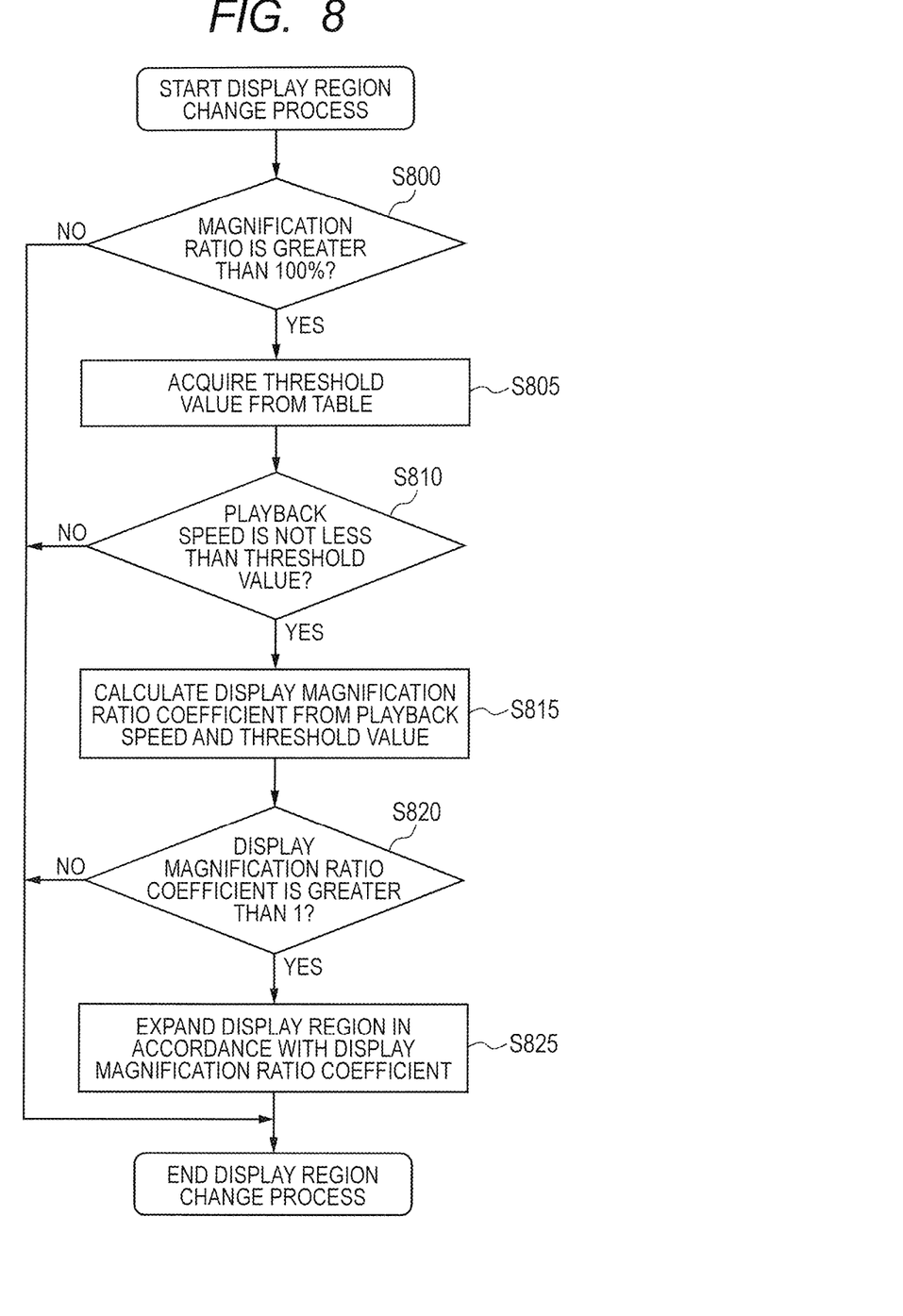
FIG. 8 is a flowchart illustrating the procedure of a display region change process in the image processing method according to the second embodiment of the present invention.

An image processing method according to a second embodiment of the present invention will be described with reference to FIG. 7 and FIG. 8. Constituent elements similar to those in the image processing method and apparatus according to the first embodiment illustrated in FIG. 1 to FIG. 6C will be denoted by the same reference numerals, and their description will be omitted or simplified. FIG. 7 is a flowchart illustrating the image processing method according to the present embodiment. FIG. 8 is a flowchart illustrating the procedure of a display region change process in the image processing method according to the present embodiment.

In the present embodiment, a description will be given of a different image processing method using the image processing apparatus according to the first embodiment, which is illustrated in FIG. 1. The image processing method according to the present embodiment is also executed by application software that runs on a PC and is configured to play moving image data. The application software in the present embodiment is capable of setting the image playback speed, the image magnification ratio, and the image display position. In particular, in the present embodiment, an example will be described in which the display region is changed with not only the playback speed, but also, the magnification ratio taken into consideration. As in the first embodiment, the playback speed can be set at five different levels of 1/2× speed, 1× speed, 2× speed, 4× speed, and 8× speed. Also, as in the first embodiment, the magnification ratio can be set at four different levels of 100%, 200%, 400%, and 800%.

The image processing method according to the present embodiment is implemented by the control unit 101 executing an image playback processing program involving performing processes along the flowcharts illustrated in FIG. 7 and FIG. 8.

In FIG. 7, Step S700 to Step S730 and Step S740 to Step S770 are similar to Step S200 to Step S230 and Step S240 to Step S270 in FIG. 2, and a description thereof will, therefore, be omitted.

A display region change process in Step S735 will be described with reference to the flowchart shown in FIG. 8.

In Step S800, the control unit 101 determines whether or not the magnification ratio is set at 100%. The control unit 101 ends the display region change process in Step S735 if determining that the magnification ratio is set at 100%, since the display region does not need to be changed. On the other hand, the control unit 101 advances the process to Step S805 if determining that the magnification ratio is set at a value greater than 100%.

In Step S805, the control unit 101 acquires a playback speed threshold value (minimum value) as a requirement for changing the display region, in accordance with the set magnification ratio information. Here, playback speed threshold values as requirements for changing the display region are held in the form of a table within the program.

The table describing playback speed threshold values corresponding to magnification ratios are not particularly limited, but may be those shown below, for example.

TABLE 1

| Magnification Ratio | Playback Speed Threshold Value |
|---|---|
| 200% | 8× Speed |
| 400% | 4× Speed |
| 800% | 2× Speed |

This table indicates that, with the magnification ratio information set for example at 200%, the display region is expanded only when the playback speed is set at 8× speed or faster. Likewise, the table indicates that, with the magnification ratio information set, for example, at 400%, the display region is expanded only when the playback speed is set at 4× speed or faster.

In Step S810, the control unit 101 then determines whether or not the currently set playback speed is greater than or equal to the threshold value acquired in Step S805. If determining that the playback speed greater than or equal to the threshold value is not set, the control unit 101 determines that the display region does not need to be changed, and ends the display region change process in Step S735. On the other hand, if determining that a playback speed greater than or equal to the threshold value is set, the control unit 101 advances the process to Step S815.

In Step S815, the control unit 101 obtains a coefficient that indicates how much the display region is to be expanded, based on the currently set playback speed. In the present embodiment, this coefficient is calculated using the following calculation formula;

Display magnification ratio coefficient=(Set playback speed/Playback speed threshold Value)×2.

In this calculation formula, when, for example, the threshold value is set at 4× speed and the playback speed is set at 8× speed, the display magnification ratio coefficient is four. Also, when the threshold value is set at 4× speed and the playback speed is set at 4× speed, the display magnification ratio coefficient is 2.

In Step S820, the control unit 101 then determines whether or not the display magnification ratio coefficient is greater than one. If determining that the display magnification ratio coefficient is not more than one, the control unit 101 determines not to change the display region, and ends the display region change process in Step S735. On the other hand, if determining that the display magnification ratio coefficient is greater than one, the control unit 101 advances the process to Step S825.

In Step S825, the control unit 101 performs a process of expanding the display region in accordance with the coefficient calculated in Step S815. Specifically, the control unit 101 performs a process of expanding the display region such that each of its vertical length and horizontal length is multiplied by the calculated coefficient. For example, when the display magnification ratio coefficient calculated in Step S815 is two, the display region is set to be two times larger in the vertical direction and two times larger in the horizontal direction. After the process in Step S825, the display region change process in Step S735 ends.

In the image processing method according to the present embodiment, with the process from Step S800 to Step S825, the display region is changed only when the playback speed is not less than the threshold value. Also, the larger the display region, the less the operation is influenced by the playback speed threshold value, since the playback speed threshold value is also switched in accordance with the magnification ratio setting. For example, the operation during display at a magnification ratio of 800% is such that the display region is expanded even when the playback speed is 2× speed. However, the operation during display at a magnification ratio of 400% is such that the display region is expanded only when the playback speed is 4× speed or faster. Moreover, the operation during display at a magnification ratio of 200% is such that the display region is expanded only when the playback speed is 8× speed or faster.

As described above, the image processing method according to the present embodiment is configured to expand the display region with, not only the playback speed, but also, a correlation between the playback speed and the magnification ratio taken into consideration. In this way, when the playback speed of a moving image is changed, the display region can be changed in accordance with the display state and playback state of the moving image. Hence, the content of the moving image can be figured out more easily.

Modifications

The present invention is not limited to the above-described embodiments, and can be modified in various ways.

For example, the configuration of the image processing apparatus described in the above-described first embodiment has been exemplarily presented. Image processing apparatuses to which the present invention is applicable are not limited to the configuration illustrated in FIG. 1.

Also, in the above-described embodiments, the example has been described in which a drop-down list is used to set the playback speed. However, the playback speed may be set in accordance with how the playback slider 4D is operated. For example, the operation can be such that when the playback slider 4D is operated, a playback speed corresponding to the speed of movement of the indicator of the playback slider 4D is calculated and the display region is changed in accordance with that playback speed.

Also, in the above-described embodiments, the case has been exemplarily described in which moving image (video) data is handled as image data. However, the image processing methods in the above-described embodiments are applicable to, not only to cases of displaying moving image data, but also, cases of displaying pieces of still image data while sequentially switching them from one another. For example, as in the case of playing a moving image, the image processing methods in the above-described embodiments are also applicable to cases of sequentially feeding and displaying consecutively captured still images. In this case, the operation will be such that the magnified display region is changed in accordance with the switch speed at which to switch the display of the still images, instead of the playback speed.

Also, the configuration in the above second embodiment is such that the threshold values as requirements for changing the display region are held in the form of a table. However, different means may be used to determine the threshold value. Also, in the above-described embodiments, the example has been described in which a calculation formula is used to calculate the display magnification ratio coefficient. However, a different calculation formula or method may be used to determine the display magnification ratio coefficient.

Embodiments of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
at least one processor operatively coupled to a memory, serving as:
(a) a display device configured to display a series of images, including a selected image out of the series of images;
(b) a speed setting unit configured to set a switch speed that is a speed at which to switch the series of images from one image to a next image, when the display device displays the series of images, in order, and, based on a user's input, to change the switch speed to a selected switch speed from one of a plurality of switch speeds; and
a control unit configured to control operation of the display device such that, when the display device displays the selected image out of the series of images, to cut out a partial region of the selected image as a cutout region so that the display device displays the image of the cutout region, and, in accordance with the speed setting unit changing the switch speed to the selected switch speed during the displaying of the series of images in order on the display device, causes the display device to display an image of the cutout region, that is different from a region of the series of images displayed on the display device before the change of the switch speed, by changing a size of the cutout region, the control unit being configured to control operation to change the size of the cutout region to be a larger scale in accordance with the speed setting unit changing the selected switch speed to a faster switch speed.

2. The image processing apparatus according to claim 1, wherein the series of images is a moving image including a plurality of frames, and the switch speed is a speed at which to play the moving image.

3. The image processing apparatus according to claim 2, wherein the moving image is an omnidirectional moving image.

4. The image processing apparatus according to claim 1, wherein the series of images is a plurality of still images, and the switch speed is a speed at which to switch display of the plurality of still images.

5. The image processing apparatus according to claim 4, wherein the plurality of still images comprises consecutively captured still images.

6. The image processing apparatus according to claim 1, wherein the speed setting unit is a slider.

7. The image processing apparatus according to claim 1, wherein the control unit changes at least one of a vertical length and a horizontal length of the cutout region, in proportion to a multiplication factor of the switch speed.

8. The image processing apparatus according to claim 1, wherein the control unit changes an area of the cutout region, in proportion to a multiplication factor of the switch speed.

9. The image processing apparatus according to claim 1, wherein the control unit changes the cutout region, in a case when the changed switch speed is not less than a predetermined threshold value determined in accordance with the display region.

10. The image processing apparatus according to claim 9, wherein the larger the cutout region, the greater the threshold value for the switch speed.

11. The image processing apparatus according to claim 1, wherein the control unit is configured to control operation, when displaying the image out of the series of images on the display device, so as to cut out the partial region of the image out of the series of images and to resize the image of the cutout region such that a size of the image of the cutout region fits to an image display area of the display device.

12. An image processing method comprising:
displaying a series of images, including a selected image out of the series of images;
setting a switch speed that is a speed at which to switch the series of images from one image to a next image, when the display device displays the series of images, in order, and, based on a user's input, to change the switch speed to a selected switch speed from one of a plurality of switch speeds; and
controlling operation of the display device such that, when the display device displays the selected image out of the series of images, to cut out a partial region of the selected image as a cutout region so that the display device displays the image of the cutout region, and, in accordance with the speed setting unit changing the switch speed to the selected switch speed during the displaying of the series of images in order on the display device, causes the display device to display an image of the cutout region, that is different from a region of the series of images displayed on the display device before the change of the switch speed, by changing a size of the cutout region, when the partial region is cut out from the image out of the series of images and to change the size of the cutout region to be a larger scale in accordance with the selected switch speed being changed to a faster switch speed.

13. The image processing method according to claim 12, wherein the series of images is a moving image including a plurality of frames, and the switch speed is a speed at which to play the moving image.

14. The image processing method according to claim 13, wherein the moving image is an omnidirectional moving image.

15. The image processing method according to claim 12, wherein the series of images is a plurality of still images, and the switch speed is a speed at which to switch display of the plurality of still images.

16. The image processing method according to claim 15, wherein the plurality of still images comprises consecutively captured still images.

17. The image processing method according to claim 12, wherein, in the changing of the size of the cutout region, at least one of a vertical length and a horizontal length of the cutout region is changed in proportion to a multiplication factor of the switch speed.

18. The image processing method according to claim 12, wherein, in the changing of the size of the cutout region, an area of the cutout region is changed in proportion to a multiplication factor of the switch speed.

19. The image processing method according to claim 12, wherein, in the changing of the size of the cutout region, the cutout region is changed in a case when the changed switch speed is not less than a predetermined threshold value determined in accordance with the display region.

20. The image processing method according to claim 19, wherein, the larger the cutout region, the greater the threshold value for the switch speed.

21. A non-transitory computer-readable storage medium recording a program that, when sequentially displaying a series of images on a display device, causes a computer to execute:

displaying a series of images, including a selected image out of the series of images;

setting a switch speed that is a speed at which to switch the series of images from one image to a next image, when the display device displays the series of images, in order, and, based on a user's input, to change the switch speed to a selected switch speed from one of a plurality of switch speeds; and controlling operation of the display device such that, when the display device displays the selected image out of the series of images, to cut out a partial region of the selected image as a cutout region so that the display device displays the image of the cutout region, and, in accordance with the speed setting unit changing the switch speed to the selected switch speed during the displaying of the series of images in order on the display device, causes the display device to display an image of the cutout region, that is different from a region of the series of images displayed on the display device before the change of the switch speed, by changing a size of the cutout region, when the partial region is cut out from the image out of the series of images and to change the size of the cutout region to be a larger scale in accordance with the selected switch speed being changed to a faster switch speed.

* * * * *